United States Patent
French et al.

(10) Patent No.: US 6,687,820 B2
(45) Date of Patent: Feb. 3, 2004

(54) SYSTEM INCLUDES A SELECTION MANAGER FOR REMOTELY MANAGING THE SELECTION OF AN OPERATING SYSTEM FOR A TARGET COMPUTER

(75) Inventors: Steven M. French, Austin, TX (US); Lorin E. Ullmann, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 600 days.

(21) Appl. No.: 09/731,630

(22) Filed: Dec. 7, 2000

(65) Prior Publication Data

US 2002/0073303 A1 Jun. 13, 2002

(51) Int. Cl.$^7$ .......................... G06F 15/177; G06F 9/00; G06F 9/445
(52) U.S. Cl. .................. 713/2; 713/1; 709/220; 717/174
(58) Field of Search .................. 713/1, 2; 709/220, 709/222; 717/174

(56) References Cited

U.S. PATENT DOCUMENTS

| | | | |
|---|---|---|---|
| 5,349,643 A | * 9/1994 | Cox et al. | 713/155 |
| 5,367,686 A | 11/1994 | Fisher et al. | |
| 5,454,110 A | 9/1995 | Kannan et al. | |
| 5,519,870 A | 5/1996 | Kannan et al. | |
| 5,668,992 A | 9/1997 | Hammer et al. | |
| 5,680,547 A | * 10/1997 | Chang | 709/222 |
| 5,684,952 A | * 11/1997 | Stein | 709/221 |
| 5,828,888 A | * 10/1998 | Kozaki et al. | 717/170 |
| 5,870,554 A | * 2/1999 | Grossman et al. | 713/2 |
| 5,960,175 A | * 9/1999 | Grossman et al. | 709/222 |
| 6,066,182 A | 5/2000 | Wilde et al. | |
| 6,301,612 B1 | * 10/2001 | Selitrennikoff et al. | 709/220 |
| 6,421,777 B1 | * 7/2002 | Pierre-Louis et al. | 713/2 |
| 6,490,677 B1 | * 12/2002 | Aguilar et al. | 713/1 |
| 6,532,537 B1 | * 3/2003 | Chen et al. | 713/2 |
| 6,535,976 B1 | * 3/2003 | Hoggarth et al. | 713/2 |
| 6,601,096 B1 | * 7/2003 | Lassiter, Jr. | 709/222 |
| 6,601,166 B1 | * 7/2003 | Ayyar et al. | 713/2 |

FOREIGN PATENT DOCUMENTS

| | | | |
|---|---|---|---|
| JP | 2000-112720 | * | 4/2000 |

OTHER PUBLICATIONS

"Secure Remote Configuration for Networked Computer Systems", IBM Technical Disclosure Bulletin, Jan. 1998, vol. 41, p 653–656.*

Lomas et al., "Remote Booting in a Hostile World: To Whom am I Speaking?", Computing Practices, vol. 28 Issue: 1, Jan. 1995, pp 50–54.*

* cited by examiner

*Primary Examiner*—Thomas Lee
*Assistant Examiner*—Chun Cao
(74) *Attorney, Agent, or Firm*—Cardinal Law Group; Jeffrey S. LaBaw

(57) ABSTRACT

A method of controlling the selection of operating systems at a first instance of user logon on a target device is provided. A network bootstrap program is initiated at the target device and configuration data of the target device is determined. A selection manager is designated based on the configuration data and the selection of a target operating system is controlled with the selection manager prior to executing an operating system at the target device.

23 Claims, 5 Drawing Sheets

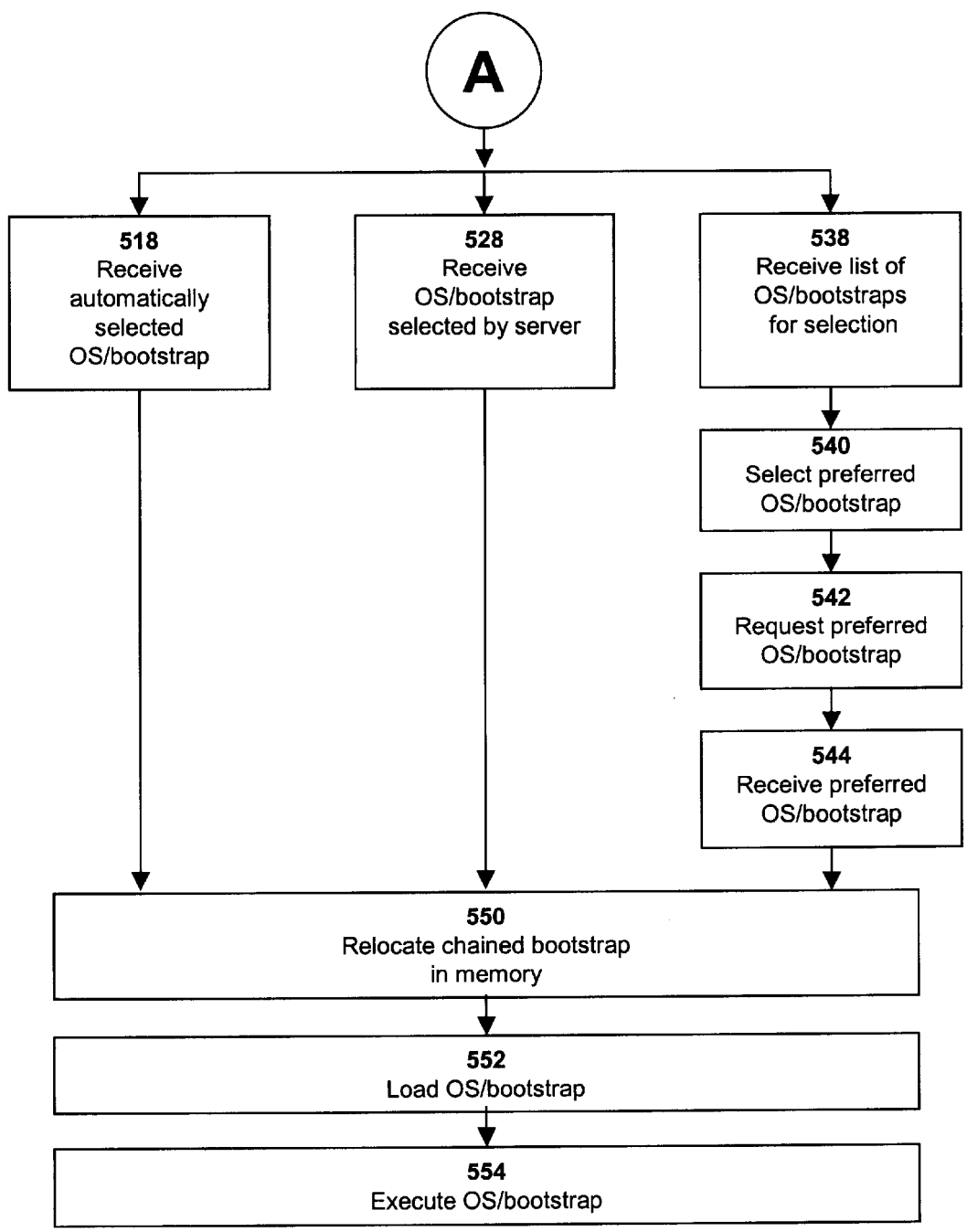

SYSTEM INCLUDES A SELECTION MANAGER FOR REMOTELY MANAGING THE SELECTION OF AN OPERATING SYSTEM FOR A TARGET COMPUTER

BACKGROUND OF THE INVENTION

1. Field of the Invention

The present invention relates to client computers that are bootable over a network and, in particular, client computers that may be serviced by multiple boot servers. More specifically, the present invention relates to a method for remotely managing the means by which a target device may choose its operating system.

2. Description of Related Art

Some current computing devices include support for pre-boot extensions to download an operating system (OS) from a network to which they are attached. Such target computing devices include computer motherboards, network adapters and boot diskettes. These devices rely on extensions to the bootstrap protocol (BOOTP) and to the dynamic host configuration protocol (DHCP). Such extensions are often termed the preboot execution environment (PXE) and require a DHCP/PXE server and a boot image negotiation layer (BINL) server.

BOOTP is a transmission control protocol/Internet protocol (TCP/IP) used by a diskless workstation, network computer (NC) or other target device to obtain its IP address and other network information, such as server address and default gateway. Upon startup, the target device sends out a BOOTP request to the BOOTP server, which returns the required information. The BOOTP request and response use an IP broadcast function, which is able to send messages before a specific IP address for a target device is known.

DHCP is software that automatically assigns an IP address to a target device logging onto a TCP/IP network. DHCP eliminates the need for manually assigning permanent IP addresses.

PXE enables a client network computer or other target device that lacks a native operating system to locate and acquire a small network bootstrap program (NBP) from a BINL server. The target device may acquire this NBP from a BINL server through a network attachment. PXE also provides a means for running the NPB on the target device. This allows the target device to continue acquiring additional software from the network that may be required to make the target device capable of performing the more complex and useful tasks assigned to it by an enterprise.

PXE relies on extensions of DHCP as the means by which the target device locates a BINL server from which to acquire an NPB. A facilitating property of DHCP is that the target device does not need the address of any other computer. The target device performs a DHCP broadcast to discover any PXE proxy server that can recognize that the target device is PXE-capable. The DHCP proxy server sends a DHCP offer to the target device. The offer contains the address of the BINL server from which the target device may obtain a NBP. The target device then obtains the NBP and all necessary software from the boot server via a trivial file transfer protocol (TFTP).

Current approaches to selecting the operating system to boot on a target device depend on the BINL server, which is delivered by multiple vendors, such as Intel™, IBM™ and Microsoft™. Each platform has different implementations and behaviors. If a number of different operating systems are available for selection on a particular device, there is no way for an administrator to administer the selection of the operating systems.

It would be desirable therefore to provide a method of selecting an operating system that overcomes the above.

SUMMARY OF THE INVENTION

One aspect of the present invention provides a method of controlling the selection of operating systems at a first instance of user logon on a target device. A network bootstrap program is initiated at the target device and configuration data of the target device is determined. A selection manager is designated based on the configuration data and the selection of a target operating system is controlled with the selection manager prior to executing an operating system at the target device.

An operating systems list may be presented to the selection manager. A request for the operating systems list may be received from the selection manager. The target operating system may be selected from the operating systems list with the selection manager. The target operating system may be sent to the target device. The network bootstrap program may be relocated after the target operating system is selected. The target operating system may then be executed on the target device At a subsequent instance of user logon on the target device, a new selection manager may be designated. The selection manager may be, for example, the target device or may be located at a server in communication with the target device.

Another aspect of the present invention provides computer program product in a computer usable medium for controlling the selection of operating systems at a first instance of user logon on a target device. The computer program product may include means for executing network bootstrap program code at the target device. The computer program product may also include means for determining configuration data of the target device and means for designating a selection manager based on the configuration data. The computer program product may also include means for controlling the selection of a target operating system with the selection manager prior to executing an operating system at the target device.

The computer program product may also include means for presenting an operating systems list to the selection manager. The computer program product may also include means for receiving from the selection manager a request for the operating systems list. The computer program product may also include means for selecting a target operating system from the operating systems list with the selection manager and means for sending the target operating system to the target device. The computer program product may also include means for relocating the network bootstrap program code after the target operating system is selected and means for executing the target operating system on the target device.

The computer program product may further include computer readable program code that designates a new selection manager at a subsequent instance of user logon on the target device.

Another aspect of the present invention provides a data processing system comprising means for initiating a network bootstrap program at a target device, means for determining configuration data of the target device, means for designating a selection manager based on the configuration data and means for controlling the selection of a target operating system at a first instance of user logon on the target device before an operating system is executed at the target device.

The system may also include means for receiving from the selection manager a request for an operating systems list, means for presenting the operating systems list to the selection manager, and means for receiving the selection of the target operating system from the operating systems list with the selection manager.

The system may also include means for sending the target operating system to the target device, means for relocating the network bootstrap program after the target operating system is received on the target device, and means for executing the target operating system on the target device.

The system may also include means for designating a new selection manager at a subsequent instance of user logon on the target device.

The foregoing, and other, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims in equivalence thereof.

BRIEF DESCRIPTION OF THE DRAWINGS

FIG. 5 is a flow diagram of one embodiment of a method of selecting an operating system continuing the embodiment of FIG. 4.

DETAILED DESCRIPTION

Figure 1:
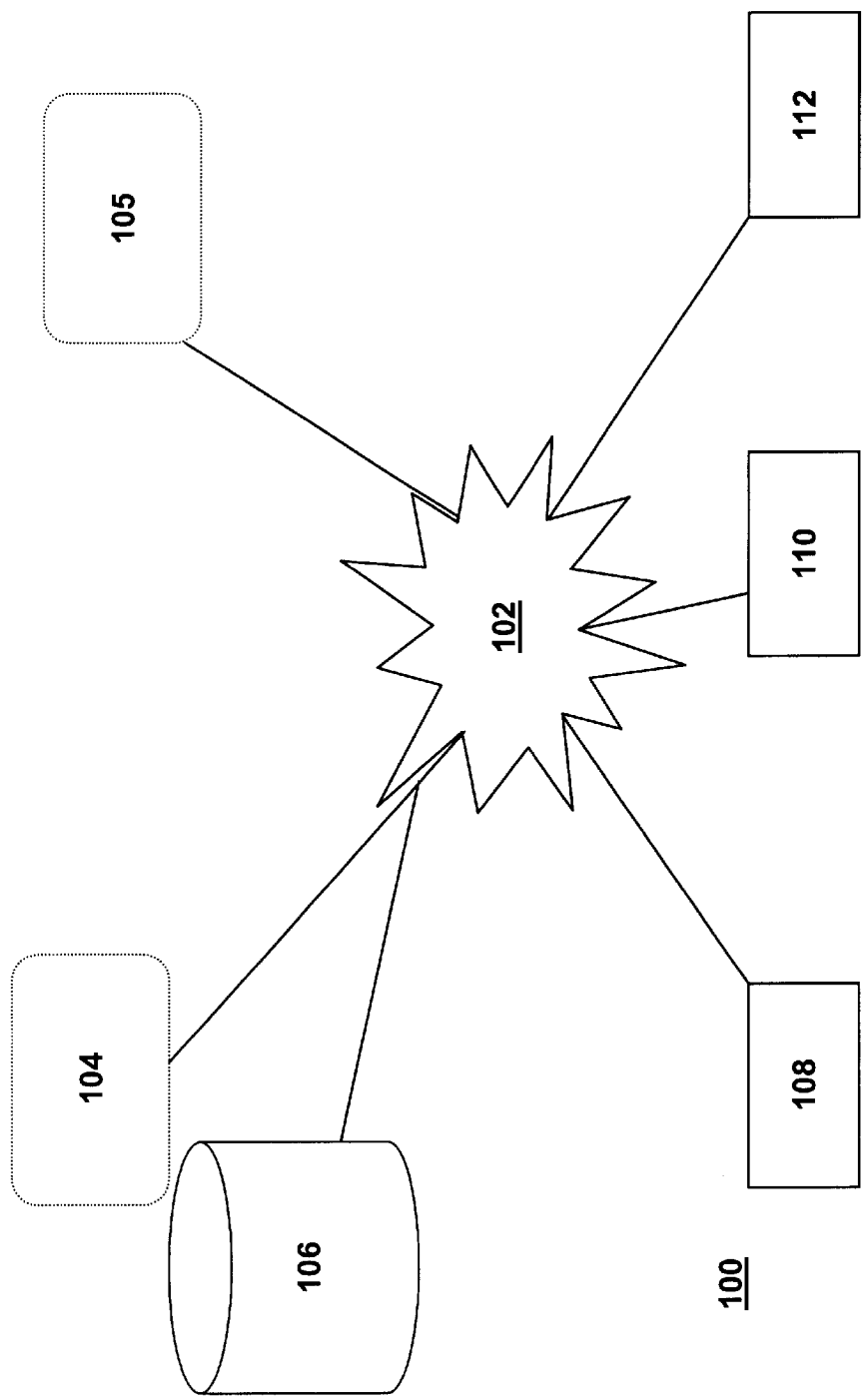
FIG. 1 is a schematic diagram of one embodiment of a network of data processing systems in accordance with the present invention.

FIG. 1 is a schematic representation of a network of data processing systems in accordance with the present invention at 100. Network data processing system 100 may be a network of computers in which the present invention may be implemented. Network data processing system 100 may contain a network. Network 102 may be any suitable medium used to provide communications links between various devices and computers connected to or in communication with each other within network data processing system 100. For example, network 102 may include connections, such as wire connections, wireless communication links or fiber optic cables.

In the embodiment of FIG. 1, a server 104 may be in communication with network 102. Server 104 may provide data, such as boot files, operating system images and applications to network 102 and/or to other components in communication with network 102 as described below. System 100 may also include another server 105 which may be identical to or different from server 104. Server 105 may also provide data, such as boot files, operating system images and applications to network 102 and/or to other components in communication with network 102 as described below. System 100 may also include additional servers (not shown).

One or more storage units, such as storage unit 106 may also be in communication with server 104, 105 and/or network 102. Storage unit 106 may store data, such as boot files, operating system images and applications that may be processed or conveyed by server 104. Storage unit 106 may also store data to be made available to or process by network 102 and/or to other components in communication with network 102 as described below.

In addition, target devices 108, 110 and 112 are also in communication with network 102. These target devices may be, for example, personal computers or network computers. Target devices 108, 110, 112 may serve as clients to server 104. Network data processing system 100 may include additional servers, clients and other devices not shown.

As seen in FIG. 1, network data processing system 100 may be any suitable system of processing data. For example system 100 may be the Internet. Alternatively, network data processing system 100 may also be any suitable type of network such as, for example, an intranet, a local area network (LAN) or a wide area network (WAN). In one embodiment of the invention, network 102 represents a worldwide collection of networks and gateways that use the TCP/IP suite of protocols to communicate with one another. A backbone of high-speed data communication lines between major nodes or host computers allows communication between thousands of commercial, government, educational and other computer systems that route data and messages.

One embodiment of the present invention provides a network environment, which may include a DHCP/PXE proxy server. For example, server 104 may be a DHCPIPXE proxy server. Alternatively, server 105 may be a DHCP/PXE proxy server. System 100 may also include one or more boot servers. For example server 104 or server 105 may serve as a boot server. These boot servers may be collated on servers 104,105 with the DHCP/PXE proxy servers. In one embodiment of the invention, one or more target devices, such as devices 108,110, 112, may include pre-boot extensions that allow the devices to download OS information from a boot server.

Figure 2:
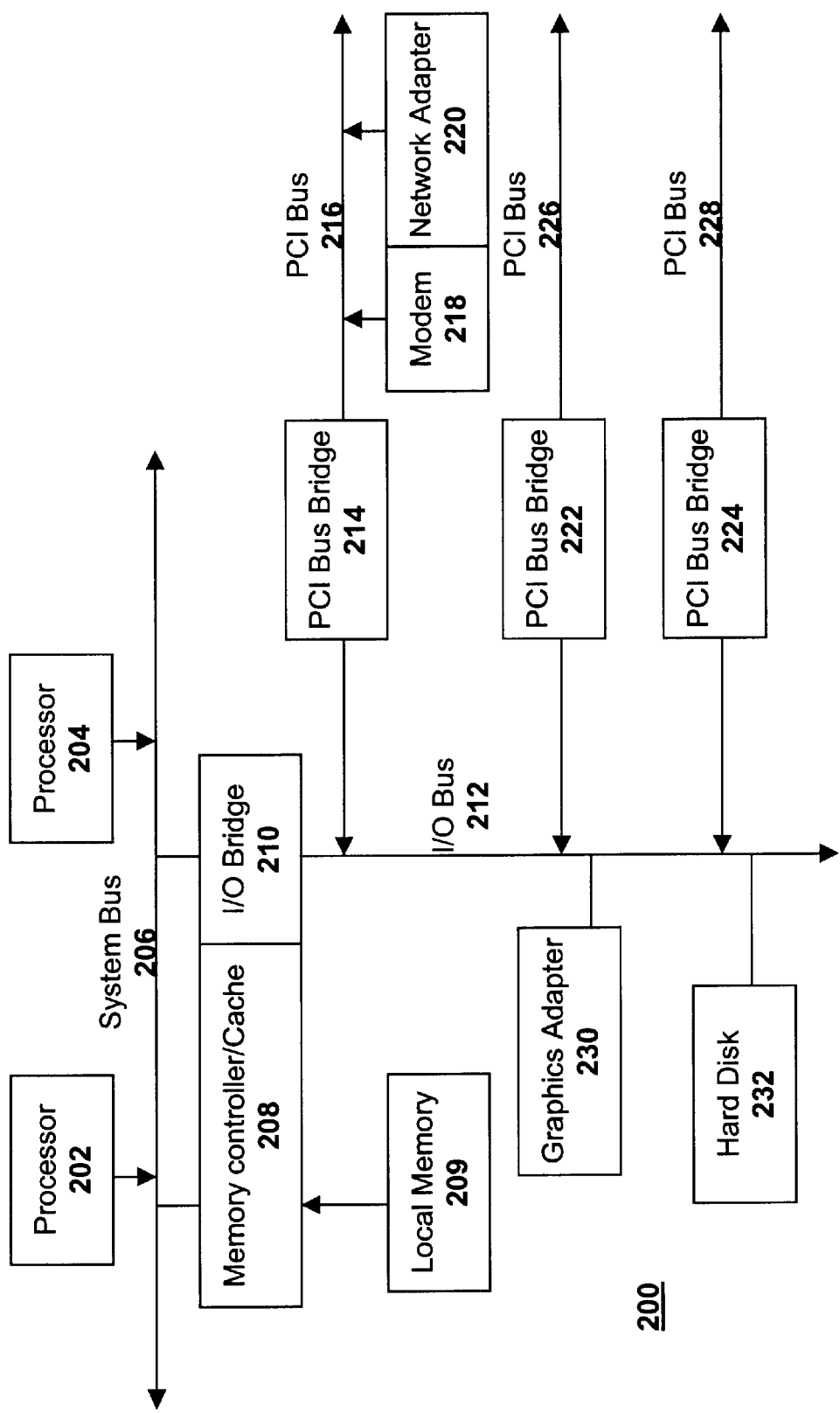
FIG. 2 is a block diagram of one embodiment of a data processing system in accordance with the present invention.

FIG. 2 is a block diagram of a data processing system in accordance with the present invention at 200. In one embodiment of the invention, data processing system 200 may be implemented as one or more of the servers 104,105 shown in FIG. 1.

Data processing system 200 may be a symmetric multi-processors (SMP) system including a plurality of processors 202 and 204 connected to system bus 206. Alternatively, a single processor system may be employed. Memory controller/cache 208 may also be connected to system bus 206. Memory controller/cache 208 may provide an interface to local memory 209. I/O bus bridge 210 may also be connected to system bus 206 and may provide an interface to I/O bus 212. Memory controller/cache 208 and I/O bus bridge 210 may be integrated as depicted or may be separate compoents.

Peripheral component interconnect (PCI) bus bridge 214 connected to I/O bus 212 may provide an interface to PCI local bus 216. One or more modems may be connected to PCI bus 216. Typical PCI bus implementations will support four PCI expansion slots or add-in connectors. Modem 218 and network 220 may be connected to PCI local bus 216. This connection may be through add-in boards. In one embodiment of the invention, modem 218 and accompanying connections provide communications links to target devices such as network computers. For example, such target devices may be those described above at FIG. 1.

Additional PCI bus bridges 222 and 224 may provide interfaces for additional PCI buses 226 and 228. Additional modems or network adapters may be supported from PCI buses 226 and 228. In this manner, data processing system 200 may allow connections to multiple network computers. A memory-mapped graphics adapter 230 and hard disk 232 may also be connected to I/O bus 212 as depicted, either directly or indirectly.

The components depicted in FIG. 2 may be arranged as shown or in any suitable manner that allows data processing system 200 to function as desired. Additionally, other peripheral devices, such as optical disk drives and the like, may be used in addition to or in place of the components depicted.

One embodiment of data processing system 200 may be an IBM RISC/System 6000 system, a product of International Business Machines Corporation in Armonk, N.Y., running the Advanced Interactive Executive (AIX) operating system.

Figure 3:
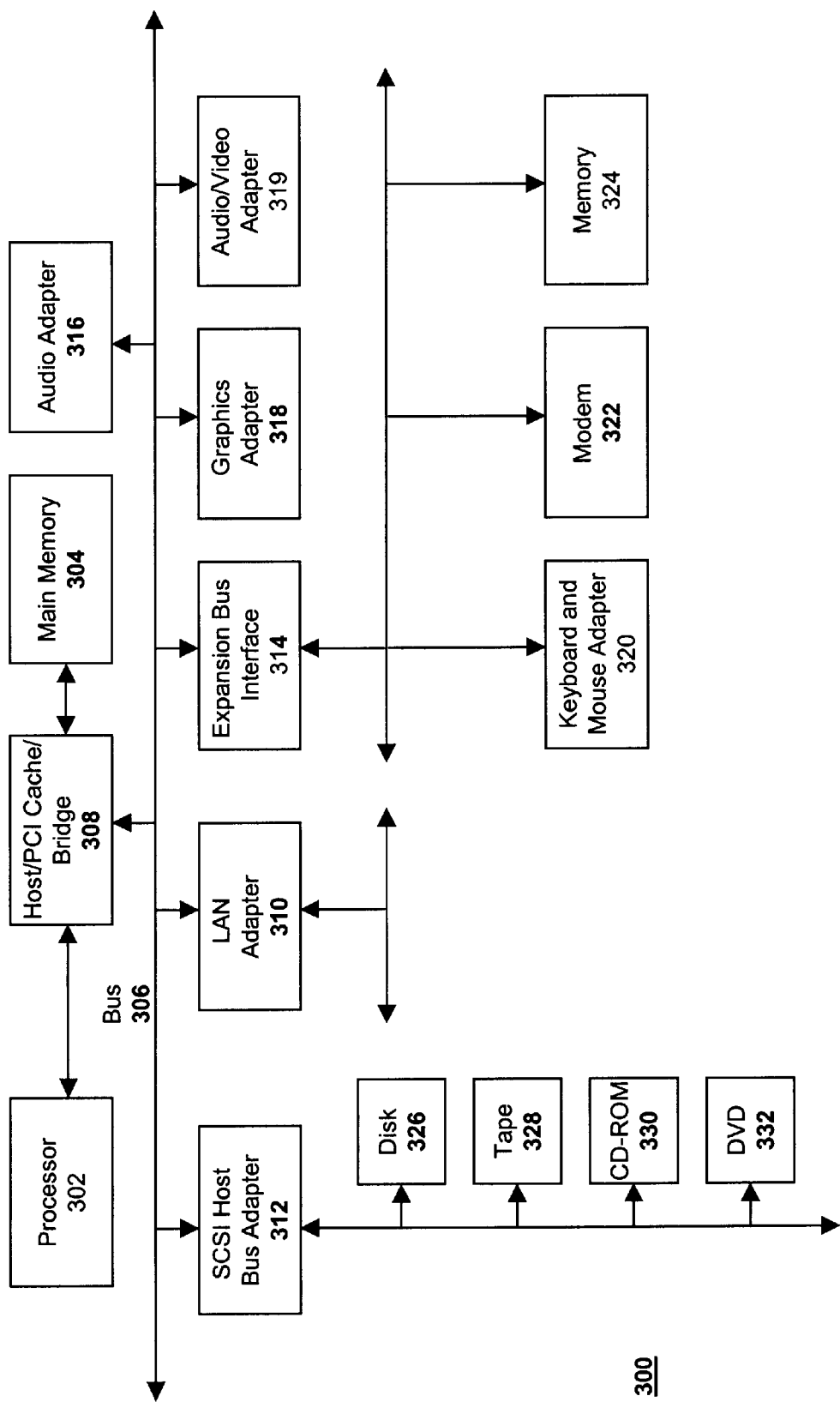
FIG. 3 is a block diagram of another embodiment of a data processing system in accordance with the present invention.

FIG. 3 is a block diagram of a data processing system in accordance with the present invention at 300. Data processing system 300 may be, for example, one or more of the target devices 108, 110, 112 depicted in FIG. 1 and described above. In one embodiment of the invention, data processing system 300 may be a stand-alone system configured to be bootable without relying on a network communication interface. Alternatively, data processing system 300 may also comprise one or more network communication interfaces. Data processing system 300 may also be a personal digital assistant (PDA) device. Data processing system may also take the form of a notebook computer or handheld computer. Alternatively, data processing system 300 may be a kiosk or Web appliance. The processes of the present invention may also be applied to a multiprocessor data processing system.

Data processing system 300 may employ a peripheral component interconnect (PCI) local bus architecture. Although the depicted example employs a PIC bus, other bus architectures such as Accelerated Graphics Port (AGP) and Industry Standard Architecture (ISA) may be used. Processor 302 and main memory 304 may be connected to PCI local bus 306 via PCI bridge 308. PCI bridge 308 may also include an integrated memory controller and cache memory for processor 302. Additional connections to PCI local bus 306 may be made through direct component interconnection or through add-in boards. In one embodiment of the invention, local area network (LAN) adapter 310, SCSI host bus adapter 312, and expansion bus interface 314 are connected to PCI local bus 306 by direct component connection. In contrast, audio adapter 316, graphics adapter 318 and audio/video adapter 319 are connected to PCI local bus 306 by add-in boards inserted into expansion slots. Expansion bus interface 314 may provide a connection for additional components such as, for example, a keyboard and mouse adapter 320, a modem 322 and additional memory 324. A small computer system interface (SCSI) host bus adapter 312 may provide a connection for additional components such as, for example, a hard disk drive 326, a tape drive 328, a CD-ROM drive 330 or a DVD 332. PCI local bus 306 may be any suitable local bus implementation. Typical PCI local bus implementations will support three or four PCI expansion slots or add-in connectors.

In one embodiment of the invention, an operating system (OS) may run on processor 302. This OS may be used to coordinate and provide control of various components within data processing system 300. The OS may be a commercially available operating system. In one embodiment of the invention, the OS is Windows 2000, which is available from Microsoft Corporation. An object oriented programming system may be in communication with the OS and may run in conjunction with the OS. For example, the object-oriented programming system may provide calls to the OS from programs or applications executing on data processing system 300. These programs or applications may be specific to the object-oriented programming system or may be programs or applications run by other programming systems. In one embodiment of the invention, the object-oriented programming system may be Java™, a trademark of Sun Microsystems, Inc.

Instructions for the OS, the object-oriented operating system, and applications or programs may be located on storage devices such as, for example, hard disk drive 326. These operating systems, applications and/or programs may be loaded into main memory 304 for execution by processor 302.

The components of system 300 depicted in FIG. 3 may be arranged as shown or in any suitable manner that allows data processing system 300 to function as desired. Other internal hardware or peripheral devices, such as flash ROM (or equivalent nonvolatile memory) or optical disk drives and the like, may be used in addition to or in place of the components depicted. For example, one embodiment of data processing system 300 may be configured with ROM and/or flash ROM in order to provide nonvolatile memory for storing operating system files and/or user-generated data.

Figure 4:
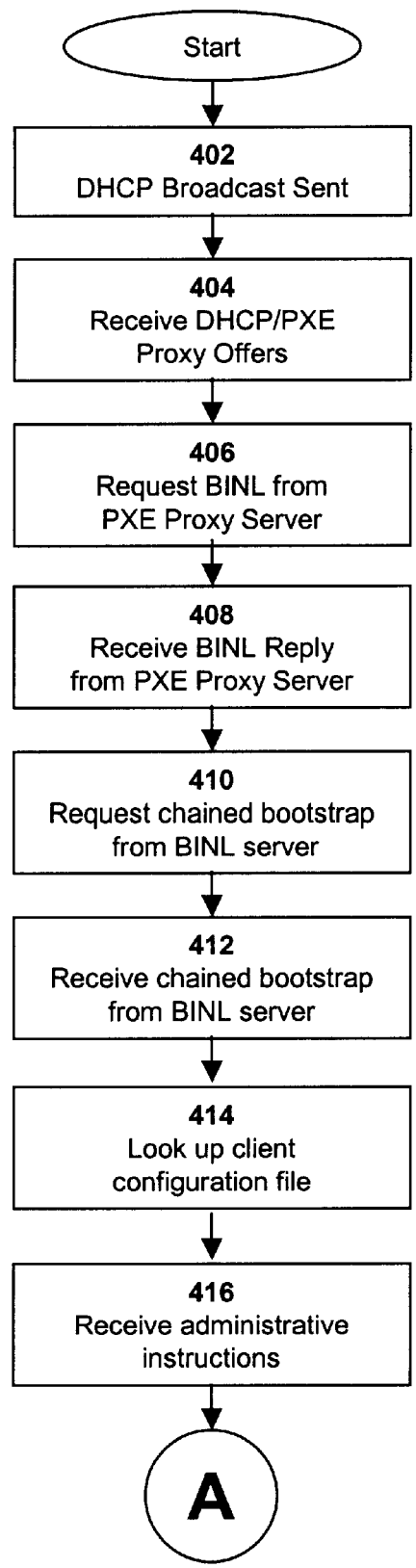
FIG. 4 is a flow diagram of one embodiment of a method of selecting an operating system in accordance with the present invention.

FIG. 4 is a flow diagram of one embodiment of a method for selecting an operating system in accordance with the present invention at 400. The operating system selected using this method may be an OS on a target device such as devices 108, 110, 112 depicted in FIG. 1 and described above. A user of a target device may login to the device before or after the process shown at 400 is completed.

At block 402, the target device may send a DHCP broadcast. For example, the target device may be connected to a network and send the DHCP broadcast to the network and servers, such as BINL servers, in communication with the network.

At block 404, the target device may receive DHCP/PXE proxy offers. These proxy offers may typically indicate which other components in communication with the target device are able to process a BINL request.

At block 406, the target device may send a BINL request to a PXE proxy server. In one embodiment of the invention, this PXE proxy server is one of the proxy offers received at block 404.

At block 408, the target device may receive a BINL reply from the PXE proxy service. In one embodiment of the invention, this reply indicates the IP address of a BINL server.

At block 410, the target device may send a TFTP request to the BINL server indicated at block 408. In one embodiment of the invention, the request is for an initial NPB file. At block 412, the reply may be received from the BINL server. For example, the server may provide an initial NBP file to the target device.

In one embodiment of the invention, the NBP file is a chained bootstrap. This chained bootstrap may be specified once as the default bootstrap. This chained bootstrap may be the first bootstrap loaded on the target device. This chained bootstrap "chains" itself, e.g., interposes itself in front of, the actual OS/bootstrap to be used on the target machine. In one embodiment of the invention, a reference to this chained bootstrap is the only entry in the BINL server. Alternatively, a reference to this chained bootstrap may be the default reply of the BINL server. Thus, the BINL configuration may not change regardless of the OS/bootstrap eventually used on a given target device. The BINL configuration also may not change when a new OS is added into the system.

At block 416, further instructions may be received from administrative control of the server. These instructions may be based on information from the configuration file. Alternatively, the instructions may be written in a client-specific directory at the server (one per MAC address), and may contain location information for a name of a default operating system bootstrap. In one embodiment of the invention, the instructions in this client-specific directory are under administrative control.

These instructions may indicate which component of the system 200, 300 controls selection of the operating system. In one embodiment of the invention, the administrative instructions may indicate that a default OS and associated bootstrap are selected automatically. This default OS and associated bootstrap may be indicated by the target device or may be on the target device. This default OS and associated bootstrap may also be indicated by the server or may be on the server.

In another embodiment of the invention, these administrative instructions may indicate that the server will select an OS and associated bootstrap. This selection may be made, for example, by an administrator at the server. The server may select any available OS and associated bootstrap located in any suitable location such as, but not limited to, on the target device, on the server, or on a storage device in communication with the server.

In another embodiment of the invention, these administrative instructions may indicate an OS and associated bootstrap may be selected at the target device. This selection may be made, for example, by a user at the target device. The target device may select any available OS and associated bootstrap located in any suitable location such as, but not limited to, on the target device, on the server, or on a storage device in communication with the server. In one embodiment of the invention, the administrative instructions indicate that the server should send a list of available OS/bootstraps to the target device for selection.

The component of the system 200, 300 that selects the OS/bootstrap may differ depending on the circumstances indicated by the administrative instructions. For example, the instructions may indicate that in the mornings, all machines will automatically select OS/2 Warp 4™ to be loaded. Then, if a user logs in later in the day, the user may be allowed to select a different OS and associated bootstrap from a list. Then, the instructions may indicate that when a network administrator is working on the network, the selection of OS/bootstraps will be made by a network administrator.

FIG. 5 is a flow diagram of another embodiment of a method for selecting an operating system in accordance with the present invention at 500. The operating system selected using this method may be an OS on a target device such as devices 108, 110, 112 depicted in FIG. 1 and described above. The process shown at 500 may be used once the process of FIG. 4 has been used, for example, to retrieve a chained bootstrap. A user of a target device may login to the device before or after the process shown at 500 is completed.

At block 518, a default operating system and associated bootstrap may be received automatically at the target device. For example, the default operating system and associated bootstrap may have been discovered at block 414 and approved by administrative instructions at block 416. The process may the proceed to block 550 where the chained bootstrap may then relocate itself so that it does not interfere with the default OS/bootstrap. In one embodiment, the chained bootstrap relocates itself in the memory of the target device. At block 552, the default OS/bootstrap may be loaded on the target device. At block 554, the default OS/bootstrap may be executed on the target device.

Alternatively, as seen at block 528, the operating system and its associated bootstrap may have been decided administratively at block 416. For example, an administrator at a server may determine which operating system will be sent to the target device. The process may then proceed to block 550 where the chained bootstrap may then relocate itself so that it does not interfere with the default OS/bootstrap. In one embodiment, the chained bootstrap relocates itself in the memory of the target device. At block 552, the default OS/bootstrap may be loaded on the target device. At block 554, the default OS/bootstrap may be executed on the target device.

Alternatively, the operating system and its associated bootstrap may be decided at the target device. For example, the administrative instructions at block 416 may indicate that the target device should select an operating system. As seen at block 538, in one embodiment of the invention the target device receives a list of OS/bootstraps from which to select a preferred operating system. At block 540, a preferred OS and associated bootstrap may be selected. At block 542, the preferred operating system may be requested by the target device. This request may take the form of a TFTP request to the BINL server. At block 544, the requested OS/bootstrap may be received. For example, the OS and its associated bootstrap may be downloaded to the target device. At block 550, the chained bootstrap may then relocates itself so that it does not interfere with the preferred OS/bootstrap. In one embodiment, the chained bootstrap relocates itself in the memory of the target device. At block 552, the preferred OS/bootstrap may be loaded on the target device. At block 554, the preferred OS/bootstrap may be executed on the target device.

As described above, the selection of an OS and associated bootstrap may occur more than once at a given target device. Furthermore, an OS and associated bootstrap may be selected by one component in one instance, for example by the server or by an administrator at the server and then by another component in another instance, for example by the target device or a user at the target device. For example, when a user first logs on to a target device, the only OS/bootstrap available for selection may be a default selection of Windows 2000™. However, if the same target device is accessed by an administrator at the server, Linux and OS/2 Warp 4 may also be available for selection. Furthermore, communication between the same target device and the server may determine that when the same user logs on within certain parameters, (e.g. after the user has been through a software training program or after 5 p.m. on weekdays), the user may then receive other OS/bootstrap selections at the target device in addition to Windows 2000™.

While the present invention has been described in the context of a fully functioning data processing system, it will be appreciated that the processes described may be distributed in any other suitable context. For example, the processes described may take the form of a computer readable medium of instructions. The present invention applies equally regardless of the type of signal bearing media actually used to carry out the distribution. Examples of computer readable media include recordable-type medium, such as a floppy disk, a hard disk drive, a RAM, CD-ROMs, DVD-ROMS, and transmission-type media, such as digital and analog communications links, wired or wireless communications links using transmission forms such as, for example, radio frequency and light wave transmissions. The computer readable media may take the form of coded formats that are decoded for actual use in a particular data processing system.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of controlling the selection of operating systems at a first instance of user logon on a target device, comprising the steps of:

initiating a network bootstrap program at the target device;

determining configuration data of the target device;

designating a selection manager based on the configuration data; and controlling the selection of a target operating system with the selection manager prior to executing an operating system at the target device.

2. The method of claim 1 further comprising:

presenting an operating systems list to the selection manager.

3. The method of claim 2 further comprising:

receiving from the selection manager a request for the operating systems list.

4. The method of claim 1 further comprising:

selecting a target operating system from the operating systems list with the selection manager.

5. The method of claim 4 further comprising:

sending the target operating system to the target device.

6. The method of claim 4 further comprising:

relocating the network bootstrap program after the target operating system is selected.

7. The method of claim 4 further comprising:

executing the target operating system on the target device.

8. The method of claim 1 further comprising:

at a subsequent instance of user logon on the target device, designating a new selection manager.

9. The method of claim 1 wherein the selection manager is the target device.

10. The method of claim 1 wherein the selection manager is at a server in communication with the target device.

11. The method of claim 1 wherein the selection manager is a combination of the target device and a managing component at the server.

12. Computer program product in a computer usable medium for controlling the selection of operating systems at a first instance of user logon on a target device, comprising:

means for executing network bootstrap program code at the target device;

means for determining configuration data of the target device;

means for designating a selection manager based on the configuration data; and means for controlling the selection of a target operating system with the selection manager prior to executing an operating system at the target device.

13. The program of claim 12 further comprising:

means for presenting an operating systems list to the selection manager.

14. The program of claim 13 further comprising:

means for receiving from the selection manager a request for the operating systems list.

15. The program of claim 12 further comprising:

means for selecting a target operating system from the operating systems list with the selection manager.

16. The program of claim 15 further comprising:

means for sending the target operating system to the target device.

17. The program of claim 15 further comprising:

means for relocating the network bootstrap program code after the target operating system is selected.

18. The program of claim 15 further comprising:

means for executing the target operating system on the target device.

19. The program of claim 12 further comprising:

means for designating a new selection manager at a subsequent instance of user logon on the target device.

20. A data processing system comprising:

means for initiating a network bootstrap program at a target device;

means for determining configuration data of the target device;

means for designating a selection manager based on the configuration data; and means for controlling the selection of a target operating system at a first instance of user logon on the target device before an operating system is executed at the target device.

21. The system of claim 20, further comprising:

means for receiving from the selection manager a request for an operating systems list;

means for presenting the operating systems list to the selection manager; and means for receiving the selection of the target operating system from the operating systems list with the selection manager.

22. The system of claim 20 further comprising:

means for sending the target operating system to the target device;

means for relocating the network bootstrap program after the target operating system is received on the target device; and means for executing the target operating system on the target device.

23. The system of claim 20, further comprising:

means for designating a new selection manager at a subsequent instance of user logon on the target device.

* * * * *